(12) United States Patent
Huang

(10) Patent No.: US 11,250,543 B2
(45) Date of Patent: Feb. 15, 2022

(54) MEDICAL IMAGING USING NEURAL NETWORKS

(71) Applicant: Neusoft Medical Systems Co., Ltd., Shenyang (CN)

(72) Inventor: Feng Huang, Shanghai (CN)

(73) Assignee: Neusoft Medical Systems Co., Ltd., Liaoning (CN)

(*) Notice: Subject to any disclaimer, the term of this patent is extended or adjusted under 35 U.S.C. 154(b) by 15 days.

(21) Appl. No.: 16/904,981

(22) Filed: Jun. 18, 2020

(65) Prior Publication Data
US 2020/0402204 A1    Dec. 24, 2020

(30) Foreign Application Priority Data
Jun. 19, 2019   (CN) .......................... 201910532012.1

(51) Int. Cl.
*G06T 3/40*   (2006.01)
*G06T 7/10*   (2017.01)
(Continued)

(52) U.S. Cl.
CPC .......... *G06T 3/4053* (2013.01); *G06T 3/4046* (2013.01); *G06T 7/0012* (2013.01);
(Continued)

(58) Field of Classification Search
None
See application file for complete search history.

(56) References Cited

U.S. PATENT DOCUMENTS

| 2019/0294108 A1* | 9/2019 | Ozcan | G03H 1/0486 |
| 2019/0294992 A1* | 9/2019 | Zhu | G06N 3/0454 |

(Continued)

FOREIGN PATENT DOCUMENTS

| CN | 108814603 | 11/2018 |
| CN | 109410337 | 3/2019 |
| CN | 109583576 | 4/2019 |

OTHER PUBLICATIONS

CN Office Action in Chinese Appln. No. 201910532012.1, dated Nov. 4, 2020, 17 pages (with English Translation).
(Continued)

*Primary Examiner* — Jiangeng Sun
(74) *Attorney, Agent, or Firm* — Fish & Richardson P.C.

(57) ABSTRACT

Methods, devices, systems and apparatus for medical imaging, e.g., Magnetic Resonance (MR) imaging or Computed Tomography (CT) imaging, using neural networks are provided. In one aspect, an imaging method includes: determining a first neural network and a second neural network corresponding to a target imaging task, the first neural network including a first neural network parameter and a first neural network model, the second neural network including a second neural network parameter and a second neural network model, obtaining a reconstructed image by performing reconstruction for down-sampling data of a tissue under test using the first neural network, the target imaging task corresponding to the tissue under test, and obtaining an image output by a second neural network as a target image of the tissue under test by performing an image processing operation corresponding to the target imaging task for the reconstructed image using the second neural network.

20 Claims, 5 Drawing Sheets

(51) Int. Cl.
*G06T 7/00* (2017.01)
*G06T 11/00* (2006.01)
(52) U.S. Cl.
CPC .............. *G06T 7/10* (2017.01); *G06T 11/003* (2013.01); *G06T 2207/10088* (2013.01); *G06T 2207/20081* (2013.01); *G06T 2207/20084* (2013.01); *G06T 2207/30168* (2013.01); *G06T 2210/41* (2013.01); *G06T 2211/424* (2013.01)

(56) References Cited

U.S. PATENT DOCUMENTS

| | | | | |
|---|---|---|---|---|
| 2019/0336101 | A1* | 11/2019 | Chiang | G01S 7/52079 |
| 2019/0369190 | A1* | 12/2019 | Ye | G01R 33/56 |
| 2020/0034948 | A1* | 1/2020 | Park | A61N 5/1039 |
| 2020/0034998 | A1* | 1/2020 | Schlemper | G06F 17/142 |
| 2020/0049785 | A1* | 2/2020 | Liu | G01R 33/4835 |
| 2020/0058106 | A1* | 2/2020 | Lazarus | G01R 33/565 |
| 2020/0160509 | A1* | 5/2020 | Pack | G06T 7/0012 |
| 2020/0219262 | A1* | 7/2020 | Hsiao | G06N 3/0454 |
| 2020/0284866 | A1* | 9/2020 | Kim | G06N 3/0454 |

OTHER PUBLICATIONS

Olaf Ronneberger et al, "U-Net: Convolutional Networks for Biomedical Image Segmentation," Computer Science Department and BIOSS Centre for Biological Signalling Studies, University of Freiburg, Germany, 2015, 8 pages.

Liang et al., "Artificial Neural Network Training Method Based on EM Algorithm," Chapter 5, Research and Application of Electromagnetism-like Mechanism, Dec. 31, 2017, 6 pages (with Partial Translation).

Office Action and Search Report in Chinese Appln. No. 201910532012.1, dated May 19, 2021, 16 pages (with Partial Machine Translation).

* cited by examiner

MEDICAL IMAGING USING NEURAL NETWORKS

CROSS REFERENCE TO RELATED APPLICATIONS

This application claims priority to Chinese Patent Application No. 201910532012.1, filed on Jun. 19, 2019, the entire content of which is incorporated herein by reference.

BACKGROUND

Medical imaging is a common technical approach in the current medical field. The traditional medical imaging method is employed to finally obtain an image with a high signal-to-noise ratio, a high resolution and good contrast under the guidance of entire image quality.

NEUSOFT MEDICAL SYSTEMS CO., LTD. (NMS), founded in 1998 with its world headquarters in China, is a leading supplier of medical equipment, medical IT solutions, and healthcare services. NMS supplies medical equipment with a wide portfolio, including CT, Magnetic Resonance Imaging (MRI), digital X-ray machine, ultrasound, Positron Emission Tomography (PET), Linear Accelerator (LINAC), and biochemistry analyser. Currently, NMS' products are exported to over 60 countries and regions around the globe, serving more than 5,000 renowned customers. NMS's latest successful developments, such as 128 Multi-Slice CT Scanner System, Superconducting MRI, LINAC, and PET products, have led China to become a global high-end medical equipment producer. As an integrated supplier with extensive experience in large medical equipment, NMS has been committed to the study of avoiding secondary potential harm caused by excessive X-ray irradiation to the subject during the CT scanning process.

SUMMARY

The present disclosure provides methods, devices, systems and apparatus for medical imaging, e.g., MR imaging or CT imaging, using neural networks, for example, to improve image availability for medical use.

One aspect of the present disclosure features an imaging method including: determining a first neural network and a second neural network corresponding to a target imaging task of a plurality of target imaging tasks, where the first neural network includes a first neural network parameter and a first neural network model, and the second neural network includes a second neural network parameter and a second neural network model, and where, for each of the plurality of target imaging tasks, the first neural network includes a respective first neural network parameter and the second neural network includes a respective second neural network parameter; obtaining a reconstructed image by performing reconstruction for down-sampling data of a tissue under test using the first neural network, the target imaging task corresponding to the tissue under test; and obtaining an image output of the second neural network as a target image of the tissue under test by performing an image processing operation corresponding to the target imaging task for the reconstructed image using the second neural network.

In some embodiments, obtaining the reconstructed image by performing reconstruction for the down-sampling data of the tissue under test using the first neural network includes: obtaining an input image by performing image reconstruction for the down-sampling data of the tissue under test; and obtaining the reconstructed image by performing reconstruction for the input image using the first neural network.

The imaging method can further include: obtaining down-sampling data and full-sampling data of a sample tissue of each sample in a plurality of samples, where the sample tissue and the tissue under test are same in type; and obtaining the first neural network parameter and the second neural network parameter by training the first neural network model and second neural network model according to the down-sampling data and the full-sampling data of the sample tissues of the plurality of the samples and the target image task.

In some embodiments, obtaining the first neural network parameter and the second neural network parameter by training the first neural network model and the second neural network model includes: obtaining an input set, a first annotation set and a second annotation set corresponding to the target imaging task, where the input set, the first annotation set and the second annotation set are determined according to the down-sampling data and the full-sampling data of the sample tissues of the plurality of the samples; obtaining a first output result of the first neural network model by inputting the input set into the first neural network model; obtaining a second output result of the second neural network model by inputting the first output result into the second neural network model; obtaining a loss value of a first loss function of the first neural network model based on the first output result and the first annotation set, where each of the plurality of target imaging tasks corresponds to a respective first loss function of the first neural network model; obtaining a loss value of a second loss function of the second neural network model based on the second output result and the second annotation set, where each of the plurality of target imaging tasks corresponds to a respective second loss function of the second neural network model; and stopping training of the first neural network and the second neural network and determining the first neural network parameter and the second neural network parameter in response to at least one of determining that the first loss function and the second loss function are both converged or determining that an epoch number of iterative training reaches a preset number, the epoch number being increased by one each time when the plurality of samples iteratively are utilized in the training of the first neural network and the second neural network.

In some embodiments, obtaining the input set, the first annotation set and the second annotation set corresponding to the target imaging task includes: for each sample in the plurality of the samples, obtaining a first reconstructed image by performing image reconstruction for down-sampling data of the sample, the input set corresponding to the target imaging task including the plurality of the first reconstructed images; for each sample in the plurality of the samples, obtaining a second reconstructed image by performing image reconstruction for full-sampling data of the sample, the first annotation set corresponding to the target imaging task including the plurality of the second reconstructed images; and for each second reconstructed image in the plurality of the second reconstructed images, obtaining an image by performing the image processing operation corresponding to the target imaging task for the second reconstructed image, the second annotation set corresponding to the target imaging task including the plurality of the images.

In some embodiments, the down-sampling data of the tissue under test is obtained by performing magnetic resonance (MR) imaging for the tissue under test, and obtaining the input image by performing image reconstruction for the down-sampling data of the tissue under test includes: obtaining the input image by performing reconstruction for down-sampling k-space data of the tissue under test based on inverse Fourier transform or sensitivity encoding. In some examples, the tissue under test includes a brain tissue, and the target imaging task includes grey matter and white matter segmentation. In some examples, the tissue under test includes an abdominal tissue, and the target imaging task includes water and fat separation.

In some embodiments, the down-sampling data of the tissue under test is obtained by performing Computed Tomography (CT) imaging for the tissue under test, and obtaining the input image by performing image reconstruction for the down-sampling data of the tissue under test includes: obtaining the input image by performing filter back-projection reconstruction for a down-sampling chordal graph of the tissue under test. In some examples, the tissue under test includes a lung tissue, and the target imaging task includes lung tissue segmentation.

Another aspect of the present disclosure features an imaging apparatus for a medical imaging system, the imaging apparatus including: at least one processor; and at least one non-transitory machine readable storage medium coupled to the at least one processor having machine-executable instructions stored thereon that, when executed by the at least one processor, cause the at least one processor to perform operations including: determining a first neural network and a second neural network corresponding to a target imaging task of a plurality of target imaging tasks, where the first neural network includes a first neural network parameter and a first neural network model, and the second neural network includes a second neural network parameter and a second neural network model, and where, for each of the plurality of target imaging tasks, the first neural network includes a respective first neural network parameter and the second neural network includes a respective second neural network parameter; obtaining a reconstructed image by performing reconstruction for down-sampling data of a tissue under test using the first neural network, the target imaging task corresponding to the tissue under test; and obtaining an image output of the second neural network as a target image of the tissue under test by performing an image processing operation corresponding to the target imaging task for the reconstructed image using the second neural network.

In some embodiments, obtaining the reconstructed image by performing reconstruction for the down-sampling data of the tissue under test using the first neural network includes: obtaining an input image by performing image reconstruction for the down-sampling data of the tissue under test; and obtaining the reconstructed image by performing reconstruction for the input image using the first neural network.

In some embodiments, the operations further include: obtaining down-sampling data and full-sampling data of a sample tissue of each sample in a plurality of samples, where the sample tissue and the tissue under test are same in type; and obtaining the first neural network parameter and the second neural network parameter by training the first neural network model and second neural network model according to the down-sampling data and full-sampling data of the sample tissues of the plurality of the samples and the target imaging task.

In some embodiments, obtaining the first neural network parameter and the second neural network parameter by training the first neural network model and the second neural network model includes: obtaining an input set, a first annotation set and a second annotation set corresponding to the target imaging task, where the input set, the first annotation set and the second annotation set are determined by the down-sampling data and full-sampling data of the sample tissues of the plurality of the samples; obtaining a first output result of the first neural network model by inputting the input set into the first neural network model; obtaining a second output result of the second neural network model by inputting the first output result into the second neural network model; obtaining a loss value of a first loss function of the first neural network model based on the first output result and the first annotation set, where each of the plurality of target imaging tasks corresponds to a respective first loss function of the first neural network model; obtaining a loss value of a second loss function of the second neural network model based on the second output result and the second annotation set, where each of the plurality of target imaging tasks corresponds to a respective second loss function of the second neural network model; and stopping training of the first neural network and the second neural network and determining the first neural network parameter and the second neural network parameter in response to at least one of determining that the first loss function and the second loss function are both converged or determining that an epoch number of iterative training reaches a preset number, the epoch number being increased by one each time when the plurality of samples iteratively are utilized in the training of the first neural network and the second neural network.

In some embodiments, obtaining the input set, the first annotation set and the second annotation set corresponding to the target imaging task includes: for each sample in the plurality of the samples, obtaining a first reconstructed image by performing image reconstruction for down-sampling data of the sample, the input set corresponding to the target imaging task including the plurality of the first reconstructed images; for each sample in the plurality of the samples, obtaining a second reconstructed image by performing image reconstruction for full-sampling data of the sample, the first annotation set corresponding to the target imaging task including the plurality of the second reconstructed images; and for each second reconstructed image in the plurality of the second reconstructed images, obtaining an image by performing the image processing operation corresponding to the target imaging task for the second reconstructed image, the second annotation set corresponding to the target imaging task including the plurality of the images.

In some embodiments, the medical imaging system includes a magnetic resonance imaging system, and obtaining the input image by performing image reconstruction for the down-sampling data of the tissue under test includes: obtaining the input image by performing reconstruction for down-sampling k-space data of the tissue under test based on inverse Fourier transform or sensitivity encoding. In some examples, the target imaging task includes one of: grey matter and white matter segmentation for the tissue under test being a brain tissue, and water and fat separation for the tissue under test being an abdominal tissue.

In some embodiments, the medical imaging system includes a CT imaging system, and obtaining the input image by performing image reconstruction for the down-sampling data of the tissue under test includes: obtaining the input image by performing filter back-projection reconstruction for a down-sampling chordal graph of the tissue under test. In some examples, the tissue under test includes a lung tissue, and the target imaging task includes a lung tissue segmentation.

A further aspect of the present disclosure features a medical imaging system including: a medical imaging scanner configured to perform medical scans on tissues with scanning sequences; and an imaging apparatus coupled to the medical imaging scanner, the imaging apparatus including: at least one processor; and at least one non-transitory machine readable storage medium coupled to the at least one processor having machine-executable instructions stored thereon that, when executed by the at least one processor, cause the at least one processor to perform operations including: determining a first neural network and a second neural network corresponding to a target imaging task of a plurality of target imaging tasks, where the first neural network includes a first neural network parameter and a first neural network model, and the second neural network includes a second neural network parameter and a second neural network model, and where, for each of the plurality of target imaging tasks, the first neural network includes a respective first neural network parameter and the second neural network includes a respective second neural network parameter; obtaining a reconstructed image by performing reconstruction for down-sampling data of a tissue under test using the first neural network, the target imaging task corresponding to the tissue under test, the down-sampling data of the tissue under test being obtained by performing a medical scan for the tissue under test by the medical imaging scanner; and obtaining an image output of the second neural network as a target image of the tissue under test by performing an image processing operation corresponding to the target imaging task for the reconstructed image using the second neural network.

Other embodiments of these aspects include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The details of one or more examples of the subject matter described in the present disclosure are set forth in the accompanying drawings and description below. Other features, aspects, and advantages of the subject matter will become apparent from the description, the drawings, and the claims. Features of the present disclosure are illustrated by way of example and not limited in the following figures, in which like numerals indicate like elements.

DETAILED DESCRIPTION

Figure 1:
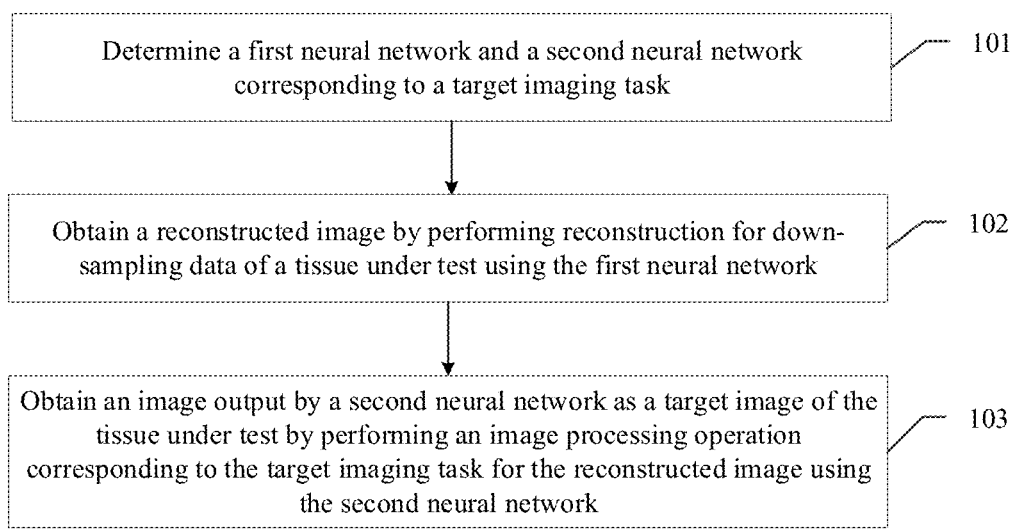
FIG. 1 is a flowchart of a process illustrating an imaging method according to an example of the present disclosure.

Some medical imaging methods focus on an overall quality of an image, and neglect a possible quality problem in a small region. For example, although the overall quality of the image is high, the small region where a lesion is located may have severe artifacts, noises or poor contrasts. Obviously, in this example, it is difficult for a doctor to obtain required information from the image due to the quality problem of the small region. Therefore, the image has a low availability for medical use.

Implementations of the present disclosure provide an imaging method and apparatus which are oriented to a target imaging task, so as to realize imaging for a tissue under test. Two pre-trained neural networks, e.g., a first neural network and a second neural network, are mainly applied during imaging. Both the first neural network and the second neural network correspond to the target imaging task, that is, the first neural network and the second neural network apply specific network parameters corresponding to the target imaging task during imaging.

The first neural network may be any common neural network, such as a Fully Convolutional Network, U-Net, a Generative Adversarial Net (GAN). The second neural network may be any common neural network, such as a Fully Convolutional Network, U-Net, a GAN, and so on, which is not limited in the present disclosure. The second neural network may be the same as the first neural network, or may be different from the first neural network.

According to the method, a reconstructed image is obtained by firstly performing reconstruction for down-sampling data of the tissue under test using the first neural network corresponding to the target imaging task. Next, to obtain an image of the tissue under test that can reflect information required by a doctor, the reconstructed image is input into the second neural network. An image processing operation corresponding to the target imaging task is performed for the reconstructed image using the second neural network, and the second neural network outputs a target image of the tissue under test. The first neural network ensures that the target image has a high quality, and the second neural network ensures that the target image conforms to the target imaging task, such that the target image can better reflect the information required by the doctor. Therefore, the method can effectively improve the availability of the target image for medical use.

In addition, a first neural network parameter and a second neural network parameter both correspond to the target imaging task. Therefore, for different target imaging tasks, it is only required to load the first neural network parameter and the second neural network parameter corresponding to each of the target imaging tasks. Therefore, the applicability of the method can be broad, and the first neural network and the second neural network can be applied for multiple different target imaging tasks.

To make those skilled in the art better understand the solutions of the present disclosure, the technical solutions of the examples of the present disclosure will be described clearly and completely below in combination with drawings in the examples of the present disclosure. Apparently, the described examples are merely a part of the examples of the present disclosure rather than all of the examples. Based on the examples in the present disclosure, other examples achieved by those skilled in the art without creative efforts shall all fall into the scope of protection of the present disclosure.

FIG. 1 is a flowchart of a process illustrating an imaging method according to an example of the present disclosure. As shown in FIG. 1, the process of the imaging method according to the example includes the following steps.

At step 101, a first neural network and a second neural network corresponding to a target imaging task are determined, where the first neural network includes a first neural network parameter and a first neural network model, the second neural network includes a second neural network parameter and a second neural network model. For each of target imaging tasks, the first neural network can include a respective first neural network parameter, and the second neural network can include a respective second neural network parameter.

An objective of the imaging method in the example is to enable a finally-obtained image to accurately reflect information required by a doctor. It can be understood that, in different application scenarios, the information to be reflected on an image and required by the doctor is different. For example, in a scenario that a Magnetic Resonance Imaging (MRI) system performs MRI for a brain tissue of patient A, the doctor requires the image to have a good grey matter and white matter segmentation effect. For another example, in a scenario that the MRI system performs MRI for an abdominal tissue of patient B, the doctor requires the image to have a good water and fat separation effect. For still another example, in a scenario that a Computed Tomography (CT) system performs CT imaging for a lung tissue of patient C, the doctor requires the image to have a good lung tissue segmentation effect.

The brain tissue includes grey matter and white matter. The grey matter and white matter segmentation refers to segmenting grey matter and white matter for the brain tissue, so as to measure a brain volume by use of a segmentation result. Water and fat separation refers to obtaining a water only image or a fat only image by displaying water signals or fat signals separately. The water only image is equivalent to a fat-suppressed image with fat completely removed. Water and fat segmentation may be performed for the abdominal tissue, an image obtained by water and fat separation can be used to perform accurate fat quantitative calculation. The lung tissue segmentation refers to segmenting different tissues of a lung, such that growth statuses of the different tissues of the lung may be analyzed by using a segmentation result.

A concept of a target imaging task is introduced in the present disclosure, and the target imaging task can be completed by implementing the imaging method according to the present disclosure. The target imaging task indicates an imaging requirement for implementing the method according to the present disclosure.

For convenience of understanding, the first neural network and the second neural network are briefly described here. In this example, the first neural network and the second neural network are both obtained by pre-training. The first neural network includes a first neural network parameter and a first neural network model. The second neural network includes a second neural network parameter and a second neural network model. Each of target imaging tasks correspond to a specific first neural network parameter and a specific second neural network parameter. For example, the first neural network parameter corresponding to a task for segmenting the lung tissue is different from the first neural network parameter corresponding to a task for segmenting the grey matter and white matter of the brain tissue, and the second neural network parameter corresponding to the task for segmenting the lung tissue is also different from the second neural network parameter corresponding to the task for segmenting the grey matter and white matter of the brain tissue. In this example, the first neural network and the second neural network can both orient to different target imaging tasks. When a target imaging task is determined, the first neural network parameter corresponding to the target imaging task is loaded into the first neural network, and the second neural network parameter corresponding to the target imaging task is loaded into the second neural network. In this way, the first neural network and the second neural network can implement respective functions corresponding to the target imaging task.

At step 102, a reconstructed image is obtained by performing reconstruction for the down-sampling data of a tissue under test using the first neural network.

In a practical application, the tissue under test may be a brain tissue, an abdominal tissue, a lung tissue, or the like. A specific type of the tissue under test is not limited in the present disclosure. It is to be noted that the same tissue under test may correspond to different target imaging tasks in different scenarios. For example, a target imaging task with respect to performing MRI for the brain tissue is different from a target imaging task with respect to performing CT imaging for the brain tissue.

In addition, it is to be noted that for the same tissue under test, for example, brain tissue, different target imaging tasks correspond to different first neural network parameters and different second neural network parameters.

A function of the first neural network is to obtain an image with better quality by performing reconstruction for down-sampling data of a tissue under test. A medical device can perform a down-sampling scan for the tissue under test to obtain the down-sampling data of the tissue under test. For those skilled in the art, down-sampling and full-sampling manners both belong to mature technical approaches in the MRI and/or CT system. The method of obtaining the down-sampling data is not specifically limited in the present disclosure. Compared with a full-sampling manner, a data amount of the tissue under test obtained by a down-sampling manner is relatively smaller. Collecting data for the tissue under test using the down-sampling manner can reduce scan time and/or a scan dose.

In this example, step 102 may have several possible implementations.

In a first implementation, the reconstructed image is obtained by directly performing reconstruction for the down-sampling data of the tissue under test using the first neural network corresponding to the target imaging task.

In this implementation, the down-sampling data of the tissue under test is directly taken as an input of the first neural network, and the first neural network directly processes the input down-sampling data of the tissue under test, e.g., directly using the down-sampling data to reconstruct an image.

In a second implementation, an input image is obtained by performing image reconstruction for the down-sampling data of the tissue under test; and the reconstructed image is obtained by performing reconstruction for the input image using the first neural network corresponding to the target imaging task.

An image of the tissue under test can be preliminarily obtained by performing reconstruction for the down-sampling data of the tissue under test. The image may be referred to as an input image, that is, an image to be subsequently input into the first neural network. Quality of the image is slightly poor and therefore the image is input into the first neural network to improve the image quality.

The quality of the reconstructed image obtained by inputting the input image into the first neural network corresponding to the target imaging task is improved compared with that of the input image. In this implementation, the input image serves as the input of the first neural network, and the first neural network obtains the reconstructed image by processing the input image. In this implementation, since the input and output of the first neural network are both images, the first neural network realizes image reconstruction in an image domain. A training difficulty and a structural complexity of the first neural network can be both reduced compared with that in the first implementation.

Although quality of the reconstructed image obtained at step 102 is improved, it is still difficult to ensure that the image can reflect information required by a doctor. Therefore, step 103 is performed.

At step 103, an image output by the second neural network is obtained as a target image of the tissue under test by performing an image processing operation corresponding to the target imaging task for the reconstructed image using the second neural network.

In this example, a function of the second neural network is to perform the image processing operation corresponding to the target imaging task for an image input into the second neural network.

As an example, if the tissue under test is a brain tissue and the target imaging task is to perform grey matter and white matter segmentation for a magnetic resonance image of the brain tissue, at this step, the second neural network specifically adopts a second neural network parameter corresponding to the target imaging task, and performs a specific image processing operation corresponding to the grey matter and white matter segmentation for the reconstructed image obtained at step 102. The grey matter and white matter segmentation performed for the magnetic resonance image of the brain tissue belongs to a mature technical approach, and a specific flow of performing the image processing operation corresponding to the grey matter and white matter segmentation is not limited herein.

As another example, if the tissue under test is an abdominal tissue and the target imaging task is to perform water and fat separation for a magnetic resonance image of the abdominal tissue, at this step, the second neural network specifically adopts the second neural network parameter corresponding to the target imaging task, and performs a specific image processing operation corresponding to the water and fat separation for the reconstructed image obtained at step 102. Similarly, the water and fat separation performed for the magnetic resonance image of the abdominal tissue belongs to a mature technical approach, and a specific flow of performing the image processing operation corresponding to the water and fat separation is not limited herein.

As still another example, if the tissue under test is a lung tissue and the target imaging task is to perform lung tissue segmentation for a CT image of the lung tissue, at this step, the second neural network specifically adopts the second neural network parameter corresponding to the target imaging task, and performs a specific image processing operation corresponding to the lung tissue segmentation for the reconstructed image obtained at step 102. In this example, the lung tissue segmentation performed for the CT image belongs to a mature technical approach, and a specific flow of performing the image processing operation corresponding to lung tissue segmentation is not limited herein.

It may be understood that the target image of the tissue under test obtained at this step conforms to the target imaging task and can reflect the information required by the doctor.

The above is the imaging method according to this example. In this method, imaging may be performed for the tissue under test by using the trained first neural network and the trained second neural network oriented to different target imaging tasks. The first neural network can obtain an image with better quality by performing reconstruction for the down-sampling data of the tissue under test. The second neural network can perform the image processing operation corresponding to the target imaging task for the image with better quality output by the first neural network, so as to obtain the target image of the tissue under test conforming to the target imaging task. The image obtained by the method is matched with the target imaging task and can more accurately reflect the information required by the doctor. Therefore, the target image has a wider availability for medical use.

In addition, the first neural network and the second neural network in this example are both generated oriented to multiple target imaging tasks. When facing different target imaging tasks, the first neural network and the second neural network can adopt respective neural network parameters corresponding to each of the different target imaging tasks. The method can be widely applicable to the different target imaging tasks, and the first neural network and the second neural network can be trained for serving the different target imaging tasks.

To make the first neural network and the second neural network in the present disclosure applicable to multiple target imaging tasks, the first neural network and the second neural network may be pre-trained before imaging is performed for the tissue under test. Based on the foregoing example, implementations of the present disclosure further provide another imaging method. This method is based on the second implementation of step 102 in the above example. A specific implementation of the method will be described and explained below in combination with the example and drawings.

Figure 2A:
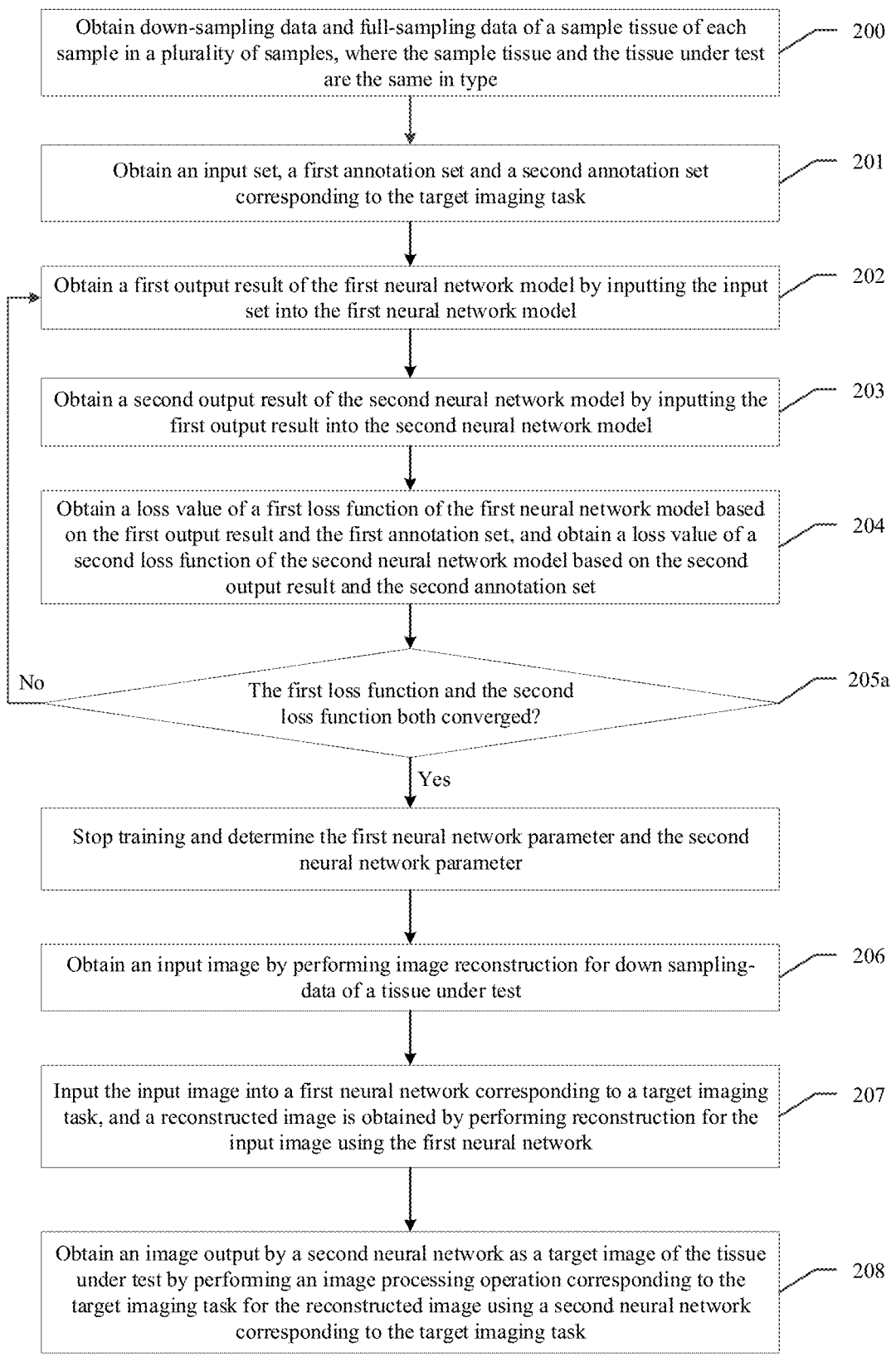
FIG. 2A is a flowchart of a process illustrating an imaging method according to another example of the present disclosure.
Figure 2B:
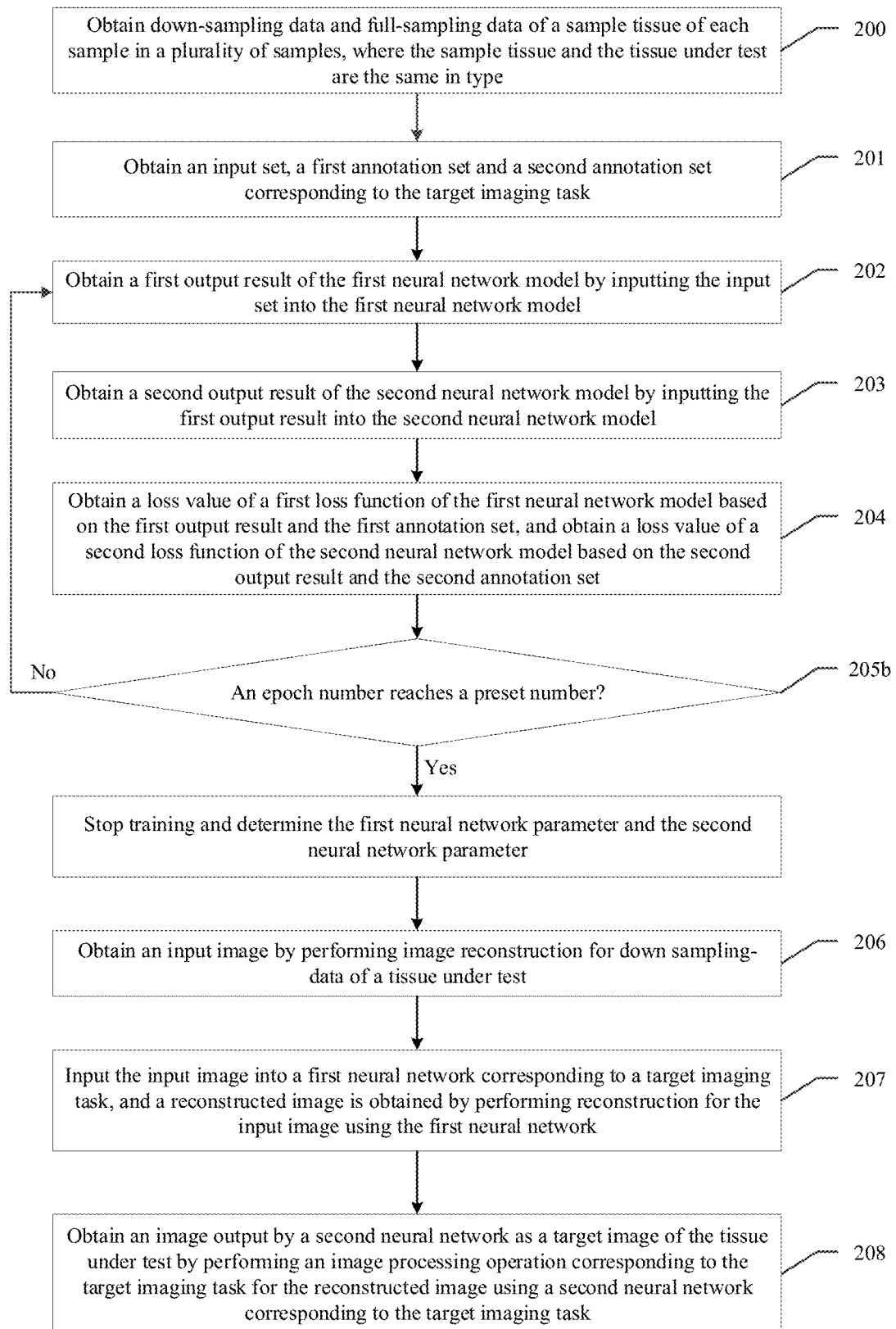
FIG. 2B is a flowchart of a process illustrating an imaging method according to still another example of the present disclosure.

FIG. 2A is a flowchart of a process illustrating an imaging method according to another example of the present disclosure. FIG. 2B is a flowchart of a process illustrating an imaging method according to still another example of the present disclosure. FIGS. 2A and 2B only differ in step 205a and 205b. The following mainly use FIG. 2A as an example for description, and a corresponding part in FIG. 2B may refer to the description in FIG. 2A. As shown in FIG. 2A, the process of the imaging method according to the example includes the following steps.

At step 200, down-sampling data and full-sampling data of a sample tissue of each sample in a plurality of samples are obtained, where the sample tissue and the tissue under test are the same in type or have the same type.

To ensure that the first neural network and the second neural network obtained by training are applicable to a tissue under test in the practical application, the sample tissue and the tissue under test are same in type in this example. For example, if the tissue under test is a lung tissue, the sample tissue is also a lung tissue; if the tissue under test is a brain tissue, the sample tissue is also a brain tissue.

In the example of the present disclosure, the first neural network model is trained according to a plurality of samples, and the second neural network model is trained according to the plurality of the samples, such that the first neural network parameter and the second neural network parameter are obtained. The plurality of the samples can be referred to as a training sample set. For convenience of understanding, this process will be described in detail below in combination with steps 201-205a or steps 201-205b in FIG. 2B.

At step 201, an input set, a first annotation set and a second annotation set corresponding to a target imaging task are obtained.

The input set, the first annotation set and the second annotation set are included in the training sample set for the first neural network and the second neural network. It is to be noted that in a training process, the first neural network and the second neural network are trained together or mutually, that is, not trained separately. The input set is taken as an input of the first neural network, and an output of the first neural network is taken as an input of the second neural network. Therefore, the input set, the first annotation set and the second annotation set can affect the trainings of both the first neural network and the second neural network at the same time.

In this example, a specific training sample set corresponding to each target imaging task can be obtained. For example, training sample set D1 corresponding to a first target imaging task, training sample set D2 corresponding to a second target imaging task and training sample set D3 corresponding to a third target imaging task, may be obtained respectively. When training the first neural network and the second neural network, a first neural network parameter and a second neural network parameter corresponding to the first target imaging task may be firstly obtained by performing the training with training sample set D1, then the obtained first neural network parameter and second neural network parameter corresponding to the first target imaging task are stored. After the previous training is ended, a first neural network parameter and a second neural network parameter corresponding to the second target imaging task are then obtained by performing the training with training sample set D2, and the obtained first neural network parameter and the second neural network parameter corresponding to the second target imaging task are stored. The processes of performing the training oriented to other target imaging tasks are in a similar way, and will not be enumerated here.

In this example, the specific training process is described in combination with steps 201-205a or steps 201-205b. For convenience of understanding, descriptions are made by taking one target imaging task in a plurality of target imaging tasks as an example at steps 201-205a or steps 201-205b.

To ensure that the first neural network and the second neural network obtained by training are applicable to the target imaging task in the practical application, the training sample set obtained at this step and the target imaging task are to be matched with each other and correspond to each other.

A first reconstructed image is obtained by performing image reconstruction for the down-sampling data of the sample tissue of each sample in the plurality of the samples, and the input set corresponding to the target imaging task includes the plurality of first reconstructed images. As an example, if the target imaging task is to perform grey matter and white matter segmentation for a magnetic resonance image of a brain tissue, the sample tissue is the brain tissue, and magnetic resonance scans may be performed for brains of a plurality of patients respectively, then magnetic resonance down-sampling data and magnetic resonance full-sampling data of the brain tissue of each patient can be obtained. One first reconstructed image may be obtained by performing reconstruction for the magnetic resonance down-sampling data of the brain tissue of each patient. The number of patients involved in the input set is not limited in this example. For example, the input set may be a plurality of first reconstructed images obtained by performing reconstruction for the down-sampling data of 100 patients or a plurality of first reconstructed images obtained by performing reconstruction for the down-sampling data of 200 patients.

When the first neural network and the second neural network are put into actual applications after training, an input image obtained by performing image reconstruction for down-sampling data of a tissue under test are taken as an input of the first neural network. Therefore, to ensure the applicability of the first neural network in the practical application, it is required that the down-sampling manners of the sample tissue and the tissue under test are the same, and the reconstruction manner for the down-sampling data of the sample tissue is the same as that of the down-sampling data of the tissue under test.

As an example, when MRI is performed for the tissue under test, the obtained down-sampling data of the tissue under test specifically can be down-sampling k-space data. The down-sampling k-space data may be obtained by performing sampling based on a Cartesian sampling (e.g., linear sampling) trajectory, for example, an interlaced scan is performed for the tissue under test such as a brain tissue. The input image of the first neural network is an image obtained by performing reconstruction for the down-sampling k-space data of the tissue under test based on a sensitivity encoding (SENSE) method. As a result, the input set obtained at this step includes: the first reconstructed image obtained after the reconstruction is performed for the down-sampling k-space data of the sampled tissue based on the SENSE method, where the down-sampling k-space data of the sample tissue is obtained by performing sampling based on the same Cartesian sampling trajectory, for example, the down-sampling k-space data is obtained by performing the interlaced scan for the sample tissue such as the brain tissue.

As another example, when CT imaging is performed for the tissue under test, the obtained down-sampling data of the tissue under test specifically can be a down-sampling chordal graph (for example, a chordal graph obtained by performing a 180° scan for the tissue under test by a CT system). The input image of the first neural network is an image obtained by performing filter back-projection reconstruction for the down-sampling chordal graph of the tissue under test. As a result, the input set obtained at this step includes: the first reconstructed image obtained by performing filter back-projection reconstruction for a down-sampling chordal graph of the sample tissue, where the sample tissue and the tissue under test are the same.

It may be understood that the above are merely examples. In this example, to perform MRI for the tissue under test, the down-sampling k-space data of the tissue under test may also be obtained by performing sampling based on any one of the following sampling trajectories: a radial sampling trajectory, a random sampling trajectory and a Poisson distribution sampling trajectory. Further, the down-sampling k-space data may also be reconstructed by other reconstruction methods such as inverse Fourier transform. The down-sampling trajectory of the tissue under test is not limited herein, and the reconstruction manner for the down-sampling k-space data of the tissue under test is also not limited herein.

The first annotation set corresponding to the target imaging task includes: a second reconstructed image obtained by performing image reconstruction for the full-sampling data of the sample tissue. For example, if the target imaging task relates to MRI, the second reconstructed image may be obtained by performing inverse Fourier transform for the full-sampling data of the sample tissue. For another example, if the target imaging task relates to CT imaging, the second reconstructed image may be obtained by performing filter back-projection reconstruction for the full-sampling data of the sample tissue. A specific implementation of obtaining the second reconstructed image is not limited in the present disclosure. In addition, the number of the second reconstructed images included in the first annotation set is not limited in this example. The number of the second reconstructed images included in the first annotation set is same as the number of the first reconstructed images included in the input set.

It may be understood that since the second reconstructed image is obtained by performing image reconstruction according to the full-sampling data of the sample tissue, quality of the second reconstructed image can be better than that of the first reconstructed image.

The second annotation set corresponding to the target imaging task includes: an image obtained after an image processing operation corresponding to the target imaging task is performed for the second reconstructed image. The image processing operation may be performed manually by a skilled operator, or may be performed automatically by a corresponding segmentation algorithm. The number of the images in the second annotation set is not limited in this example. The number of the second reconstructed images in the first annotation set is the same as the number of the images in the second annotation set.

In summary, for a specific target imaging task, one sample for training the corresponding first neural network and second neural network includes a first reconstructed image obtained by performing reconstruction for down-sampling data of a sample tissue of a patient, a second reconstructed image obtained by performing reconstruction for full-sampling data of the patient, and the image obtained by performing corresponding image processing operation for the second reconstructed image. A plurality of similar samples used for training the first neural network and the second neural network may be referred to as a training sample set, and the training sample set may be divided into an input set, a first annotation set and a second annotation set.

The input set, the first annotation set and the second annotation set corresponding to the target image task are already obtained by performing step 201, and the first neural network and the second neural network are trained below by using the input set, the first annotation set and the second annotation set corresponding to the target image task. A reference may be made to FIG. 3, which is a schematic diagram of training a first neural network and a second neural network according to an example of the present disclosure.

At step 202, a first output result of the first neural network model is obtained by inputting the input set into the first neural network model.

Figure 3:
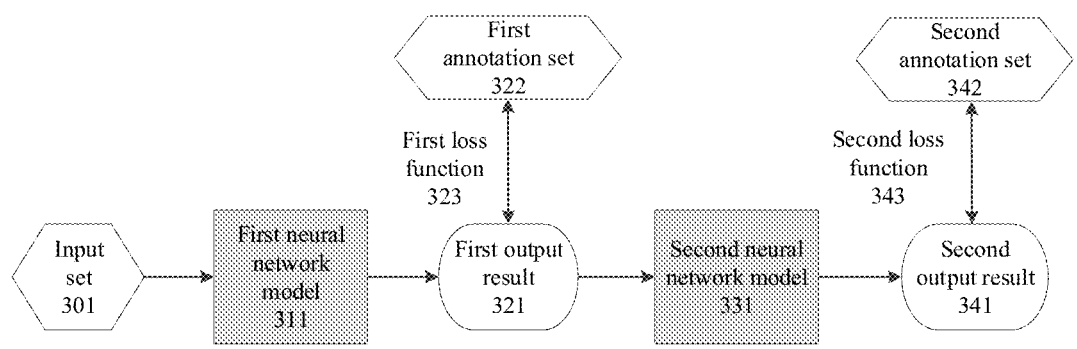
FIG. 3 is a schematic diagram illustrating training a first neural network and a second neural network according to an example of the present disclosure.

As shown in FIG. 3, after at least one first reconstructed image in input set 301 is input into first neural network model 311, first neural network model 311 processes the image and outputs first output result 321. First output result 321 is in an image form.

The first neural network model may be any common neural network, such as a Fully Convolutional Network, U-Net, a Generative Adversarial Net (GAN), and so on, which is not limited in the present disclosure.

At step 203, a second output result of the second neural network model is obtained by inputting the first output result into the second neural network model.

As shown in FIG. 3, after first output result 321 is input into second neural network model 331, second neural network model 331 processes first output result 321 and outputs second output result 341. Second output result 341 is in an image form.

The second neural network model may be any common neural network, such as a Fully Convolutional Network, U-Net, a GAN, and so on, which is not limited in the present disclosure. The second neural network model may be the same as the first neural network model, or may be different from the first neural network model.

At step 204, a loss value of a first loss function of the first neural network model is obtained based on the first output result and the first annotation set; and a loss value of a second loss function of the second neural network model is obtained based on the second output result and the second annotation set.

As shown in FIG. 3, for example, first loss function 323 obtained based on first annotation set 322 and first output result 321 may be an L1 norm or an L2 norm, and second loss function 343 obtained based on second annotation set 342 and second output result 341 may be a cross entropy. Specific types of the first loss function and the second loss function are both unlimited herein.

It can be understood that the training process of the first neural network and the second neural network is an iterative process. The first output result, the first annotation set, the second output result and the second annotation set that are adopted for one iterative training shall correspond to the same batch of samples. The loss value of the first loss function is correlated with the first output result of the first neural network model and the first annotation set. In the practical application, the closer the first output result is to a corresponding second reconstructed image in the first annotation set, the smaller the loss value of the first loss function is, indicating that the first neural network parameter is optimized better. The loss value of the second loss function is correlated with the second output result of the second neural network model and the second annotation set. In the practical application, the closer the second output result is to a corresponding second reconstructed image in the second annotation set, the smaller the loss value of the second loss function is, indicating that the second neural network parameter is optimized better.

The first neural network parameter and the second neural network parameter may be continuously optimized according to the loss value of the first loss function and the loss value of the second loss function obtained in the previous iteration. When parameters in respective layers of the first and second neural networks are optimized by using the first loss function and the second loss function, the optimized direction is a backward propagation direction.

When the first neural network and the second neural network are trained, a single sample may be input into the first neural network and the second neural network to train the first neural network and the second neural network. Several samples may also be input into the first neural network and the second neural network simultaneously to train the first neural network and the second neural network. Further, all samples may be input into the first neural network and the second neural network simultaneously to train the first neural network and the second neural network. No limitation is made to the above herein.

Parameter values in respective layers of the neural networks may be optimized with a gradient descent optimization algorithm. The gradient descent algorithm is a common method for optimizing a neural network. In the gradient descent algorithm, optimal parameter values are iteratively sought from some initial solutions. In each iteration, a gradient of an error value at a current point is firstly calculated, and then, an optimal solution is searched along a negative gradient direction. A learning rate determines a step length to reach the optimal solution, and the learning rate may be set according to an empirical value.

Different gradient descent algorithms may be used according to different sample numbers input into the first neural network at a time, that is, sample numbers in a batch. For example, when only one sample is input each time, a Stochastic Gradient Descent (SGD) algorithm may be used. When several samples are input each time, a Mini-Batch Gradient Descent (MBGD) algorithm may be used. When all samples are input simultaneously, a Batch Gradient Descent (BGD) algorithm may be used.

It is to be noted that different target imaging tasks correspond to different first loss functions; and different target imaging tasks correspond to different second loss functions.

How to determine the first neural network parameter finally adopted by the first neural network and the second neural network parameter finally adopted by the second neural network is described in detail below in combination with steps 205a and 205b. Two specific implementations are described at steps 205a in FIG. 2A and 205b in FIG. 2B respectively, one of which may be selected in the practical application.

At step 205a, it is determined that whether the first loss function and the second loss function are both converged. If the loss functions are both converged, training is stopped and the first neural network parameter and the second neural network parameter are determined, otherwise, training is continued.

In a first implementation shown in FIG. 2A, as an example, if the stochastic gradient descent method is used, it may be determined that whether the first loss function is converged to a global minimum or a better local minimum, and whether the second loss function is converged to a global minimum value or a better local minimum value. If the first loss function and the second loss function both are converged to the global minimum value and/or the better local minimum value, the training can be stopped, and a first neural network parameter and a second neural network parameter optimized just before the training is stopped are taken as the first neural network parameter and the second neural network parameter corresponding to the target imaging task. Otherwise, the training is continued to further optimize the first neural network parameter and/or the second neural network parameter.

It may be understood that since the output of the first neural network model is taken as the input of the second neural network model, the first neural network model and the second neural network model are therefore two neural network models that are mutually associated rather than mutually independent. Thus, the first neural network parameter corresponding to the target imaging task is not trained only according to the first loss function, and the second neural network parameter corresponding to the target imaging task is not trained only according to the second loss function. As can be seen from the above example, the training is stopped and the final network parameters are determined only when the first loss function and the second loss function both are converged.

At step 205b, it is determined that whether an epoch number reaches a preset number. If the epoch number does not reach the preset number, training is continued. If the epoch number reaches the preset number, the training is stopped and the first neural network parameter and the second neural network parameter are determined.

As can be seen through FIG. 2B, in a second implementation for determining the first neural network parameter and the second neural network parameter, whether to stop the training process is determined by the epoch number. After all samples in the training sample set participate in the training of the first neural network and the second neural network, one epoch is completed. As an example, the preset number may be 10, 20, or the like, which is not limited herein. Each time one epoch is completed, the epoch number is increased by 1. When the epoch number reaches the preset number, it may indicate that the epoch number is sufficient, the iteration may be stopped to end the training, and a first neural network parameter and a second neural network parameter optimized in the last training are selected as parameters adopted by the first neural network and the second neural network respectively during the practical application. For a neural network with poor convergence, training may be stopped after several epochs.

The first neural network corresponding to the target imaging task may be obtained according to the first neural network model and the trained first neural network parameter. Similarly, the second neural network corresponding to the target imaging task may be obtained according to the second neural network model and the trained second neural network parameter.

The training of the first neural network and the second neural network corresponding to a specific target imaging task is completed through the above steps 200-205a or steps 200-205b. The first neural network parameter and the second neural network parameter corresponding to the target imaging tasks are obtained by training.

For convenience of a subsequent application, respective correspondence between the first and second neural network parameters and the target imaging task may be stored.

As a possible implementation, when a specific target imaging task is executed, an imaging device (e.g., an MRI system or a CT system) can include a medical imaging scanner configured to perform a scan for the tissue under test with a predetermined scanning sequence, and different scanning sequences can be adopted for different target imaging tasks. For example, a first group of scanning sequences are adopted for a first target imaging task, and a second group of scanning sequences are adopted for a second target imaging task. If the down-sampling data of the sample tissue is obtained by performing a scan with the first group of scanning sequences, a first neural network under training corresponds to the first target imaging task; and if the down-sampling data of the tissue under test is obtained by performing a scan with the first group of scanning sequences, the down-sampling data may be input into the trained first neural network corresponding to the first target imaging task. If the down-sampling data of the sample tissue is obtained by performing a scan with the second group of scanning sequences, a first neural network under training corresponds to the second target imaging task; and if the down-sampling data of the tissue under test is obtained by performing scan with the second group of scanning sequences, the down-sampling data may be input into the trained first neural network corresponding to the second target imaging task.

Therefore, in this example, as a possible implementation, a correspondence between the first neural network parameter and the scanning sequence may be stored; a correspondence between the second neural network parameter and the scanning sequence may be stored.

It can be understood that the training of the first neural network and the second neural network corresponding to a specific target imaging task may be completed through the above steps 200-205a or steps 200-205b. To ensure the applicability of the first neural network and the second neural network for different target imaging tasks, for each target imaging task, training of the first and second neural network corresponding to the target imaging task may be completed by performing steps 200-205a or steps 200-205b.

Steps 206-208 describe a specific imaging process for the tissue under test below. Steps 207-208 specifically describe a practical application process of the trained first and second neural networks. It is to be noted that the target imaging task mentioned at steps 206-208 is one of multiple target imaging tasks oriented by the first neural network and the second neural network trained at steps 200-205a or steps 200-205b described above.

At step 206, an input image is obtained by performing image reconstruction for down-sampling data of a tissue under test.

In this example, as a possible implementation, the scanning sequence that is adopted by the imaging device (e.g., an MRI system or a CT system) to scan the tissue under test may be obtained when the down-sampling data of the tissue under test is obtained. Further, a target imaging task corresponding to the tissue under test, a first neural network parameter corresponding to the target imaging task, and a second neural network parameter corresponding to the target imaging task may be determined according to the scanning sequence, the pre-stored correspondence between the first neural network parameter and the scanning sequence, and the pre-stored correspondence between the second neural network parameter and the scanning sequence.

After the first neural network parameter corresponding to the target imaging task is determined, the first neural network corresponding to the target imaging task is also determined. Similarly, after the second neural network parameter corresponding to the target imaging task is determined, the second neural network corresponding to the target imaging task is also determined.

At step 207, the input image is input into a first neural network corresponding to a target imaging task, and a reconstructed image is obtained by performing reconstruction for the input image using the first neural network.

At step 208, the reconstructed image is input into a second neural network corresponding to the target imaging task, and an image output by the second neural network is obtained as a target image of the tissue under test by performing an image processing operation corresponding to the target imaging task for the reconstructed image using the second neural network.

In this example, the implementation of steps 206-208 is the same as the implementation of steps 102-103 in the above example. Descriptions of steps 206-208 may be referred to the above example.

The above is the imaging method according to the example of the present disclosure. According to the method, the first neural network and the second neural network are trained, such that the first neural network and the second neural network both can be oriented to a plurality of imaging tasks. For example, the first neural network and the second neural network can be applicable to both MRI for a tissue under test and CT imaging for the tissue under test. In an example, the target imaging task may be grey matter and white matter segmentation when the first neural network and the second neural network are specifically used to perform MRI for a brain tissue. In another example, the target imaging task may be water and fat separation when the first neural network and the second neural network are specifically used to perform MRI for an abdominal tissue. In still another example, the target imaging task may be lung tissue segmentation when the first neural network and the second neural network are specifically used to perform CT imaging for a lung tissue.

When performing imaging for the tissue under test oriented to a specific target imaging task, the first neural network parameter corresponding to the target imaging task is loaded to obtain the first neural network corresponding to the target imaging task, and the second neural network parameter corresponding to the target imaging task is loaded to obtain the second neural network corresponding to the target imaging task. By using the first neural network corresponding to the target imaging task and the second neural network corresponding to the target imaging task, an image of the tissue under test oriented to the target imaging task, i.e., the target image, may be correspondingly obtained. In the imaging method, the down-sampling data of the tissue under test is obtained in a down-sampling manner to improve a scan speed and/or reduce a scan dose. In addition, the trained first and second neural networks perform imaging for the tissue under test to improve quality of the target image. Especially, the target image is segmented in the second neural network according to the target imaging task. Therefore, the target image can accurately reflect the information required by a doctor.

In addition, since the first neural network and the second neural network are trained oriented to different target imaging tasks, some target imaging tasks may correspond to applications of MRI, and some target imaging tasks may correspond to applications of CT imaging. Therefore, the first neural network and the second neural network can be applied to an MRI system and/or a CT system. The method provided by the present disclosure may be implemented on different imaging devices, and which is widely used.

In this example, the process of training the neural networks based on the second implementation of step 102 in the first example is described in detail. It may be understood that the first neural network and the second neural network may also have a corresponding training flow based on the first implementation of step 102 in the first example. The flow may be understood in combination with the differences of the first implementation and the second implementation, and details are not described here again.

The imaging method of the above examples may be performed by an imaging apparatus. The imaging apparatus provided by the present disclosure will be described in detail below in combination with drawings and examples.

Figure 4:
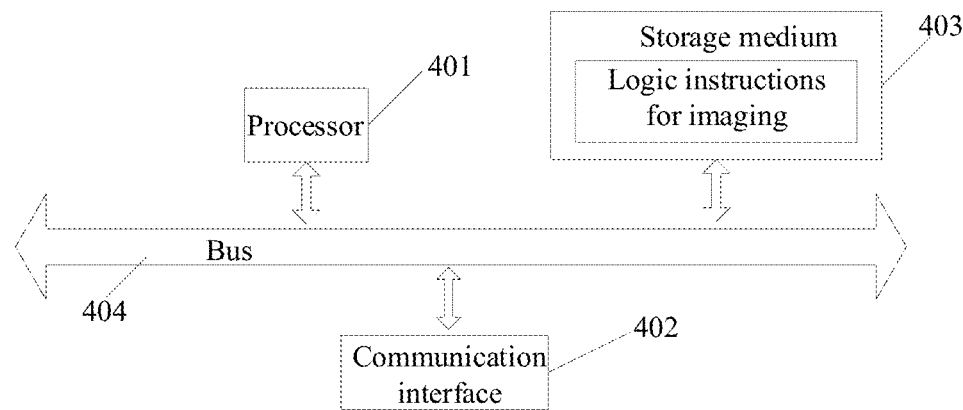
FIG. 4 is a schematic diagram illustrating a hardware structure of an imaging apparatus according to an example of the present disclosure.

FIG. 4 is a schematic diagram illustrating a hardware structure of an imaging apparatus according to an example of the present disclosure. The imaging apparatus may be applied to a CT system or an MRI system. When being applied to the CT system, the imaging apparatus is specifically configured to control the CT system to perform imaging for a tissue under test. When being applied to the MRI system, the imaging apparatus is specifically configured to control the MRI system to perform imaging for a tissue under test.

As shown in FIG. 4, the imaging apparatus according to the example includes at least one processor 401 and at least one non-transitory machine readable storage medium 403 coupled to the at least one processor 401. In some examples, the imaging apparatus may further include a communication interface 402 and a bus 404. The processor 401, the communication interface 402 and the storage medium 403 communicate with each other through the bus 404.

The storage medium 403 may store logical instructions for imaging. The storage medium 403 may be, for example, a non-volatile memory. The processor 401 may invoke and execute the logical instructions for imaging in the storage medium 403 to perform part or all of the steps in the imaging method according to the first example or the second example described above. In an implementation, the instructions for imaging may be programs corresponding to a control software. When being executed by the processor 401, the programs implement part or all of the steps in the imaging method according to the first example or the second example described above. At this time, as a possible implementation, the imaging apparatus may correspondingly display a functional interface corresponding to the instructions on a display interface.

In the imaging apparatus according to this example, imaging may be performed for the tissue under test by using the trained first neural network and the trained second neural network oriented to different target imaging tasks. The function of the first neural network is to obtain an image with better quality by performing reconstruction for the down-sampling data of the tissue under test. The function of the second neural network is to perform the image processing operation corresponding to the target imaging task for the image with better quality output by the first neural network, so as to obtain the target image of the tissue under test conforming to the target imaging task. The image obtained by the apparatus is matched with the target imaging task and can reflect the information required by the doctor more accurately. Therefore, the target image has wider availability.

In addition, the first neural network and the second neural network in this example are both generated oriented to multiple target imaging tasks. When facing different target imaging tasks, the first neural network and the second neural network adopt parameters corresponding to a specific target imaging task respectively. For example, if the target imaging task is to perform grey matter and white matter segmentation for a magnetic resonance image of a brain tissue, the first neural network and the second neural network respectively use network parameters corresponding to the grey matter and white matter segmentation, and finally, the image output by the second neural network is a high-quality magnetic resonance image of the brain tissue with the grey matter and white matter already segmented. Therefore, the apparatus is widely applicable to the target imaging tasks, and the first neural network and the second neural network can serve multiple target imaging tasks.

The functions of logical instructions for imaging, if implemented in the form of software functional modules and sold or used as independent products, may be stored in a computer readable storage medium. Based on such understanding, the technical solutions of the present disclosure essentially or a part contributing to the prior art or part of the technical solution may be embodied in the form of a software product, the computer software product is stored in a storage medium, and includes several instructions for enabling an imaging system (such as an MRI system or a CT system) to execute all or part of the steps of the imaging method according to the first example or the second example described above.

The present disclosure further provides a storage medium storing programs, and the programs are executed by the processor to implement part or all of the steps in the imaging method according to the first example or the second example of the present disclosure. The storage medium may include various mediums such as a USB disk, a mobile hard disk, a Read-Only Memory (ROM), a Random Access Memory (RAM), a diskette or a compact disk and the like which may store program codes.

The above apparatus may be divided into different functional units or modules. A reference is made to FIG. 5, which is a schematic diagram of functional division of logical instructions according to an example of the present disclosure.

Figure 5:
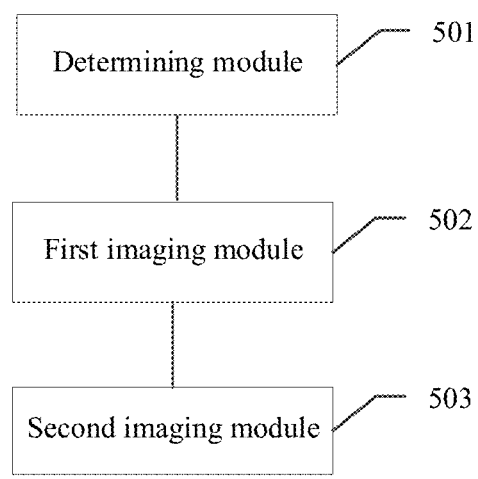
FIG. 5 is a schematic diagram of functional division of logical instructions according to an example of the present disclosure.

The logical instructions according to the example are applied to perform imaging for the tissue under test. As shown in FIG. 5, the logical instructions include a determining module 501, a first imaging module 502 and a second imaging module 503.

The determining is configured to determine a first neural network and a second neural network corresponding to a target imaging task, where the first neural network comprises a first neural network parameter and a first neural network model, the second neural network comprises a second neural network parameter and a second neural network model, and each of target imaging tasks corresponds to a specific first neural network parameter and a specific second neural network parameter.

The first imaging module 502 is configured to obtain a reconstructed image by performing reconstruction for down-sampling data of a tissue under test using the first neural network.

The second imaging module 503 is configured to an image output by a second neural network as a target image of the tissue under test by performing an image processing operation corresponding to the target imaging task for the reconstructed image using the second neural network.

Optionally, the first imaging module 502 includes: an input image obtaining unit, configured to obtain an input image by performing image reconstruction for the down-sampling data of the tissue under test; and an image reconstructing unit, configured to obtain the reconstructed image by performing reconstruction for the input image using the first neural network.

To enable the first neural network and the second neural network in the above example oriented to different target imaging tasks, the apparatus according to the example may further include a data obtaining module and a network training module.

A data obtaining module is configured to down-sampling data and full-sampling data of a sample tissue of each sample in a plurality of samples, where the sample tissue and the tissue under test are the same in type.

A network training module is configured to the first neural network parameter and the second neural network parameter by training the first neural network model and second neural network model according to the plurality of the samples.

Optionally, the network training module specifically includes: obtaining an input set, a first annotation set and a second annotation set corresponding to the target imaging task, where the input set, the first annotation set and the second annotation set are determined by the plurality of the samples; obtaining a first output result of the first neural network model by inputting the input set into the first neural network model; obtaining a second output result of the second neural network model by inputting the first output result into the second neural network model; obtaining a loss value of a first loss function of the first neural network model based on the first output result and the first annotation set, where each of target imaging tasks corresponds to a specific first loss functions; obtaining a loss value of a second loss function of the second neural network model based on the second output result and the second annotation set, where each of target imaging tasks corresponds to a specific second loss functions; and in response to determining that the first loss function and the second loss function are both converged, stopping training and determining the first neural network parameter and the second neural network parameter; or in response to determining that an epoch number reaches a preset number, stopping training and determining the first neural network parameter and the second neural network parameter.

Optionally, obtaining the input set, the first annotation set and the second annotation set corresponding to the target imaging task includes: for each sample in the plurality of the samples, obtaining a first reconstructed image by performing image reconstruction for down-sampling data of the sample; the input set corresponding to the target imaging task including the plurality of the first reconstructed images; for each sample in the plurality of the samples, obtaining a second reconstructed image by performing image reconstruction for full-sampling data of the sample; the first annotation set corresponding to the target imaging task including the plurality of the second reconstructed images; for each second reconstructed image in the plurality of the second reconstructed images, obtaining an image by performing the image processing operation corresponding to the target imaging task for the second reconstructed image; and the second annotation set corresponding to the target imaging task including the plurality of the images.

The above descriptions are made to the imaging apparatus according to the examples of the present disclosure. According to the apparatus, the first neural network and the second neural network are trained, such that the first neural network and the second neural network both can be oriented to a plurality of imaging tasks. For example, the first neural network and the second neural network can be applicable to both MRI for a tissue under test and CT imaging for the tissue under test. In an example, the target imaging task may be grey matter and white matter segmentation when the first neural network and the second neural network are specifically used to perform MRI for a brain tissue. In another example, the target imaging task may be water and fat separation when the first neural network and the second neural network are specifically used to perform MRI for an abdominal tissue. In still another example, the target imaging task may be lung tissue segmentation when the first neural network and the second neural network are specifically used to perform CT imaging for a lung tissue.

If the apparatus is specifically applied to a MRI system, when magnetic resonance imaging is performed for the tissue under test; obtaining the input image by performing image reconstruction for the down-sampling data of the tissue under test includes: obtaining the input image by performing reconstruction for down-sampling k-space data of the tissue under test based on inverse Fourier transform or a sensitivity encoding method.

Optionally, in response to that the tissue under test is a brain tissue, the target imaging task is grey matter and white matter segmentation; and in response to that the tissue under test is an abdominal tissue, the target imaging task is water and fat separation.

If the apparatus is specifically applied to a CT system, when CT imaging is performed for the tissue under test; obtaining the input image by performing image reconstruction for the down-sampling data of the tissue under test includes: obtaining the input image by performing filter back-projection reconstruction for a down-sampling chordal graph of the tissue under test.

Optionally, in response to that the tissue under test is a lung tissue, the target imaging task is lung tissue segmentation.

It is to be noted that the examples in this specification are described in a progressive manner, same or similar parts among the examples may be referred to each other, and each example focuses on differences from other examples. Since the apparatus examples substantially correspond to the method examples, a reference may be made to part of the descriptions of the method examples for the related part. The apparatus examples described above are merely illustrative, where the units described as separate members may be or not be physically separated, and the members displayed as units may be or not be physical units, e.g., may be located in one place, or may be distributed to a plurality of network units. Part or all of the modules may be selected according to actual requirements to implement the objectives of the solutions in the examples. Those of ordinary skill in the art may understand and carry out them without creative work.

For simplicity and illustrative purposes, the present disclosure is described by referring mainly to examples thereof. In the above descriptions, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

The above description is merely preferred examples of the present disclosure and is not intended to limit the present disclosure in any form. Although the present disclosure is disclosed by the above examples, the examples are not intended to limit the present disclosure. Those skilled in the art, without departing from the scope of the technical scheme of the present disclosure, may make a plurality of changes and modifications of the technical scheme of the present disclosure by the method and technical content disclosed above.

Therefore, without departing from the scope of the technical scheme of the present disclosure, based on technical essences of the present disclosure, any simple alterations, equal changes and modifications should fall within the protection scope of the technical scheme of the present disclosure. Accordingly, other embodiments are within the scope of the following claims.

What is claimed is:

1. An imaging method comprising:

obtaining down-sampling data and full-sampling data of a sample tissue of each sample in a plurality of samples, wherein the sample tissue and the tissue under test are same in type;

obtaining a first neural network parameter and a second neural network parameter by training a first neural network model and a second neural network model according to the down-sampling data and the full-sampling data of the sample tissues of the plurality of the samples and a target imaging task of a plurality of target imaging tasks;

determining a first neural network and a second neural network corresponding to the target imaging task of the plurality of target imaging tasks, wherein the first neural network comprises the first neural network parameter and the first neural network model, and the second neural network comprises the second neural network parameter and the second neural network model, and wherein, for each of the plurality of target imaging tasks, the first neural network comprises a respective first neural network parameter and the second neural network comprises a respective second neural network parameter;

obtaining a reconstructed image by performing reconstruction for down-sampling data of a tissue under test using the first neural network, the target imaging task corresponding to the tissue under test; and obtaining an image output of the second neural network as a target image of the tissue under test by performing an image processing operation corresponding to the target imaging task for the reconstructed image using the second neural network, wherein obtaining the first neural network parameter and the second neural network parameter by training the first neural network model and the second neural network model comprises:

obtaining an input set, a first annotation set and a second annotation set corresponding to the target imaging task, wherein the input set, the first annotation set and the second annotation set are determined according to the down-sampling data and the full-sampling data of the sample tissues of the plurality of the samples;

obtaining a first output result of the first neural network model by inputting the input set into the first neural network model;

obtaining a second output result of the second neural network model by inputting the first output result into the second neural network model;

obtaining a loss value of a first loss function of the first neural network model based on the first output result and the first annotation set, wherein each of the plurality of target imaging tasks corresponds to a respective first loss function of the first neural network model;

obtaining a loss value of a second loss function of the second neural network model based on the second output result and the second annotation set, wherein each of the plurality of target imaging tasks corresponds to a respective second loss function of the second neural network model; and stopping training of the first neural network and the second neural network and determining the first neural network parameter and the second neural network parameter in response to at least one of determining that the first loss function and the second loss function are both converged or determining that an epoch number of iterative training reaches a preset number, the epoch number being increased by one each time when the plurality of samples iteratively are utilized in the training of the first neural network and the second neural network.

2. The imaging method of claim 1, wherein obtaining the reconstructed image by performing reconstruction for the down-sampling data of the tissue under test using the first neural network comprises:

obtaining an input image by performing image reconstruction for the down-sampling data of the tissue under test; and obtaining the reconstructed image by performing reconstruction for the input image using the first neural network.

3. The imaging method of claim 1, wherein obtaining the input set, the first annotation set and the second annotation set corresponding to the target imaging task comprises:

for each sample in the plurality of the samples, obtaining a first reconstructed image by performing image reconstruction for down-sampling data of the sample, the input set corresponding to the target imaging task comprising the plurality of the first reconstructed images;

for each sample in the plurality of the samples, obtaining a second reconstructed image by performing image reconstruction for full-sampling data of the sample, the first annotation set corresponding to the target imaging task comprising the plurality of the second reconstructed images; and for each second reconstructed image in the plurality of the second reconstructed images, obtaining an image by performing the image processing operation corresponding to the target imaging task for the second reconstructed image, the second annotation set corresponding to the target imaging task comprising the plurality of the images.

4. The imaging method of claim 2, wherein the down-sampling data of the tissue under test is obtained by performing magnetic resonance (MR) imaging for the tissue under test, and wherein obtaining the input image by performing image reconstruction for the down-sampling data of the tissue under test comprises:

obtaining the input image by performing reconstruction for down-sampling k-space data of the tissue under test based on inverse Fourier transform or sensitivity encoding.

5. The imaging method of claim 4, wherein the tissue under test comprises a brain tissue, and the target imaging task comprises grey matter and white matter segmentation.

6. The imaging method of claim 4, wherein the tissue under test comprises an abdominal tissue, and the target imaging task comprises water and fat separation.

7. The imaging method of claim 2, wherein the down-sampling data of the tissue under test is obtained by performing Computed Tomography (CT) imaging for the tissue under test, and wherein obtaining the input image by performing image reconstruction for the down-sampling data of the tissue under test comprises:

obtaining the input image by performing filter back-projection reconstruction for a down-sampling chordal graph of the tissue under test.

8. The imaging method of claim 7, wherein the tissue under test comprises a lung tissue, and the target imaging task comprises lung tissue segmentation.

9. An imaging apparatus for a medical imaging system, the imaging apparatus comprising:
   at least one processor; and
   at least one non-transitory machine readable storage medium coupled to the at least one processor having machine-executable instructions stored thereon that, when executed by the at least one processor, cause the at least one processor to perform operations comprising:
      obtaining down-sampling data and full-sampling data of a sample tissue of each sample in a plurality of samples, wherein the sample tissue and the tissue under test are same in type;
      obtaining a first neural network parameter and a second neural network parameter by training a first neural network model and a second neural network model according to the down-sampling data and the full-sampling data of the sample tissues of the plurality of the samples and a target imaging task of a plurality of target imaging tasks;
      determining a first neural network and a second neural network corresponding to the target imaging task of the plurality of target imaging tasks, wherein the first neural network comprises the first neural network parameter and the first neural network model, and the second neural network comprises the second neural network parameter and the second neural network model, and wherein, for each of the plurality of target imaging tasks, the first neural network comprises a respective first neural network parameter and the second neural network comprises a respective second neural network parameter;
      obtaining a reconstructed image by performing reconstruction for down-sampling data of a tissue under test using the first neural network, the target imaging task corresponding to the tissue under test; and
      obtaining an image output of the second neural network as a target image of the tissue under test by performing an image processing operation corresponding to the target imaging task for the reconstructed image using the second neural network,
   wherein obtaining the first neural network parameter and the second neural network parameter by training the first neural network model and the second neural network model comprises:
      obtaining an input set, a first annotation set and a second annotation set corresponding to the target imaging the task, wherein the input set, the first annotation set and the second annotation set are determined according to the down-sampling data and the full-sampling data of the sample tissues of the plurality of the samples;
      obtaining a first output result of the first neural network model by inputting the input set into the first neural network model;
      obtaining a second output result of the second neural network model by inputting the first output result into the second neural network model;
      obtaining a loss value of a first loss function of the first neural network model based on the first output result and the first annotation set, wherein each of the plurality of target imaging tasks corresponds to a respective first loss function of the first neural network model;
      obtaining a loss value of a second loss function of the second neural network model based on the second output result and the second annotation set, wherein each of the plurality of target imaging tasks corresponds to a respective second loss function of the second neural network model; and
      stopping training of the first neural network and the second neural network and determining the first neural network parameter and the second neural network parameter in response to at least one of
         determining that the first loss function and the second loss function are both converged or
         determining that an epoch number of iterative training reaches a preset number, the epoch number being increased by one each time when the plurality of samples iteratively are utilized in the training of the first neural network and the second neural network.

10. The imaging apparatus of claim 9, wherein obtaining the reconstructed image by performing reconstruction for the down-sampling data of the tissue under test using the first neural network comprises:
   obtaining an input image by performing image reconstruction for the down-sampling data of the tissue under test; and
   obtaining the reconstructed image by performing reconstruction for the input image using the first neural network.

11. The imaging apparatus of claim 9, wherein obtaining the input set, the first annotation set and the second annotation set corresponding to the target imaging task comprises:
   for each sample in the plurality of the samples, obtaining a first reconstructed image by performing image reconstruction for down-sampling data of the sample, the input set corresponding to the target imaging task comprising the plurality of the first reconstructed images;
   for each sample in the plurality of the samples, obtaining a second reconstructed image by performing image reconstruction for full-sampling data of the sample, the first annotation set corresponding to the target imaging task comprising the plurality of the second reconstructed images; and
   for each second reconstructed image in the plurality of the second reconstructed images, obtaining an image by performing the image processing operation corresponding to the target imaging task for the second reconstructed image, the second annotation set corresponding to the target imaging task comprising the plurality of the images.

12. The imaging apparatus of claim 10, wherein the medical imaging system comprises a magnetic resonance imaging system, and
   wherein obtaining the input image by performing image reconstruction for the down-sampling data of the tissue under test comprises:
      obtaining the input image by performing reconstruction for down-sampling k-space data of the tissue under test based on inverse Fourier transform or sensitivity encoding.

13. The imaging apparatus of claim 12, wherein the target imaging task comprises one of:
   grey matter and white matter segmentation for the tissue under test being a brain tissue, and
   water and fat separation for the tissue under test being an abdominal tissue.

14. The imaging apparatus of claim 10, wherein the medical imaging system comprises a CT imaging system, and
wherein obtaining the input image by performing image reconstruction for the down-sampling data of the tissue under test comprises:
obtaining the input image by performing filter back-projection reconstruction for a down-sampling chordal graph of the tissue under test.

15. The imaging apparatus of claim 14, wherein the tissue under test comprises a lung tissue, and the target imaging task comprises a lung tissue segmentation.

16. A medical imaging system comprising:
a medical imaging scanner configured to perform medical scans on tissues with scanning sequences; and
an imaging apparatus coupled to the medical imaging scanner, the imaging apparatus comprising:
at least one processor; and
at least one non-transitory machine readable storage medium coupled to the at least one processor having machine-executable instructions stored thereon that, when executed by the at least one processor, cause the at least one processor to perform operations comprising:
obtaining down-sampling data and full-sampling data of a sample tissue of each sample in a plurality of samples, wherein the sample tissue and the tissue under test are same in type;
obtaining a first neural network parameter and a second neural network parameter by training a first neural network model and a second neural network model according to the down-sampling data and the full-sampling data of the sample tissues of the plurality of the samples and a target imaging task of a plurality of target imaging tasks;
determining a first neural network and a second neural network corresponding to the target imaging task of the plurality of target imaging tasks, wherein the first neural network comprises the first neural network parameter and the first neural network model, and the second neural network comprises the second neural network parameter and the second neural network model, and wherein, for each of the plurality of target imaging tasks, the first neural network comprises a respective first neural network parameter and the second neural network comprises a respective second neural network parameter;
obtaining a reconstructed image by performing reconstruction for down-sampling data of a tissue under test using the first neural network, the target imaging task corresponding to the tissue under test; and
obtaining an image output of the second neural network as a target image of the tissue under test by performing an image processing operation corresponding to the target imaging task for the reconstructed image using the second neural network,
wherein obtaining the first neural network parameter and the second neural network parameter by training the first neural network model and the second neural network model comprises:
obtaining an input set, a first annotation set and a second annotation set correspondingto the target imaging task, wherein the input set, the first annotation set and the second annotation set are determined according to the down-sampling data and the full-sampling data of the sample tissues of the plurality of the samples;
obtaining a first output result of the first neural network model by inputting the input set into the first neural network model;
obtaining a second output result of the second neural network model by inputting the first output result into the second neural network model;
obtaining a loss value of a first loss function of the first neural network model based on the first output result and the first annotation set, wherein each of the plurality of target imaging tasks corresponds to a respective first loss function of the first neural network model;
obtaining a loss value of a second loss function of the second neural network model based on the second output result and the second annotation set, wherein each of the plurality of target imaging tasks corresponds to a respective second loss function of the second neural network model; and
stopping training of the first neural network and the second neural network and determining the first neural network parameter and the second neural network parameter in response to at least one of
determining that the first loss function and the second loss function are both converged or
determining that an epoch number of iterative training reaches a preset number, the epoch number being increased by one each time when the plurality of samples iteratively are utilized in the training of the first neural network and the second neural network.

17. The medical imaging system of claim 16, wherein obtaining the reconstructed image by performing reconstruction for the down-sampling data of the tissue under test using the first neural network comprises:
obtaining an input image by performing image reconstruction for the down-sampling data of the tissue under test; and
obtaining the reconstructed image by performing reconstruction for the input image using the first neural network.

18. The medical imaging system of claim 17, comprising a magnetic resonance imaging system,
wherein obtaining the input image by performing image reconstruction for the down-sampling data of the tissue under test comprises:
obtaining the input image by performing reconstruction for down-sampling k-space data of the tissue under test based on inverse Fourier transform or sensitivity encoding, and
wherein the target imaging task comprises one of:
grey matter and white matter segmentation for the tissue under test being a brain tissue, and
water and fat separation for the tissue under test being an abdominal tissue.

19. The medical imaging system of claim 17, comprising a CT imaging system,
wherein obtaining the input image by performing image reconstruction for the down-sampling data of the tissue under test comprises:

obtaining the input image by performing filter back-projection reconstruction for a down-sampling chordal graph of the tissue under test, and wherein the tissue under test comprises a lung tissue, and the target imaging task comprises a lung tissue segmentation.

20. The medical imaging system of claim 16, wherein obtaining the input set, the first annotation set and the second annotation set corresponding to the target imaging task comprises:

for each sample in the plurality of the samples, obtaining a first reconstructed image by performing image reconstruction for down-sampling data of the sample, the input set corresponding to the target imaging task comprising the plurality of the first reconstructed images;

for each sample in the plurality of the samples, obtaining a second reconstructed image by performing image reconstruction for full-sampling data of the sample, the first annotation set corresponding to the target imaging task comprising the plurality of the second reconstructed images; and for each second reconstructed image in the plurality of the second reconstructed images, obtaining an image by performing the image processing operation corresponding to the target imaging task for the second reconstructed image, the second annotation set corresponding to the target imaging task comprising the plurality of the images.

* * * * *